United States Patent
Hovakimyan et al.

(10) Patent No.: US 7,853,338 B1
(45) Date of Patent: *Dec. 14, 2010

(54) ADAPTIVE OUTPUT FEEDBACK APPARATUSES AND METHODS CAPABLE OF CONTROLLING A NON-MINIMUM PHASE SYSTEM

(75) Inventors: Naira Hovakimyan, Blacksuerg, VA (US); Anthony J Calise, Atlanta, GA (US); Bong-Jun Yang, Atlanta, GA (US)

(73) Assignee: Georgia Tech Research Corporation, Atlanta, GA (US)

(*) Notice: Subject to any disclaimer, the term of this patent is extended or adjusted under 35 U.S.C. 154(b) by 402 days.

This patent is subject to a terminal disclaimer.

(21) Appl. No.: 11/845,627

(22) Filed: Aug. 27, 2007

Related U.S. Application Data

(63) Continuation of application No. 10/732,208, filed on Dec. 9, 2003, now Pat. No. 7,277,764.

(60) Provisional application No. 60/431,957, filed on Dec. 9, 2002.

(51) Int. Cl.
 G05B 13/02 (2006.01)
 G05B 1/01 (2006.01)
 G06F 7/00 (2006.01)
(52) U.S. Cl. ............... 700/45; 700/31; 700/32; 700/48; 700/72; 701/59; 701/60
(58) Field of Classification Search ......... 700/28–31, 700/32, 37–39, 40–45, 48, 54, 55, 72, 173, 700/250; 701/58–60
See application file for complete search history.

(56) References Cited

U.S. PATENT DOCUMENTS 4,663,703 A * 5/1987 Axelby et al. ............ 700/29

(Continued)

FOREIGN PATENT DOCUMENTS

GB 2 399 894 A 9/2004

(Continued)

OTHER PUBLICATIONS

N. Hovaklmyan, B.-J. Yang, A. Calise, "An Adaptive Output Feedback Control Methodology for Non-Minimum Phase Systems". Proceedings of the 41th IEEE Conference on Decision and Control, Dec. 2002. pp. 949-954, Las Vegas, Nevada.

(Continued)

*Primary Examiner*—Sean P Shechtman
(74) *Attorney, Agent, or Firm*—Patents and Licensing LLC; Daniel W. Juffernbruch

(57) ABSTRACT

The invention comprises apparatuses and methods for providing the capability to stabilize and control a non-minimum phase, nonlinear plant with unmodeled dynamics and/or parametric uncertainty through the use of adaptive output feedback. A disclosed apparatus can comprise a reference model unit for generating a reference model output signal $y_m$. The apparatus can comprise a combining unit that combines and differences a plant output signal y of a non-minimum phase plant for which not all of the states can be sensed, and a plant output signal y, to generate an output error signal $\tilde{y}$. The apparatus can further comprise an adaptive control unit for generating an adaptive control signal $u_{ad}$ used to control the plant.

20 Claims, 6 Drawing Sheets

U.S. PATENT DOCUMENTS

| | | | |
|---|---|---|---|
| 5,049,796 | A | 9/1991 | Seraji |
| 5,224,664 | A | 7/1993 | LaMontagne et al. |
| 5,268,834 | A | 12/1993 | Sanner et al. |
| 5,367,612 | A | 11/1994 | Bozich et al. |
| 5,394,322 | A | 2/1995 | Hansen |
| 5,682,309 | A | 10/1997 | Bartusiak et al. |
| 5,687,075 | A | 11/1997 | Stothers |
| 5,691,893 | A | 11/1997 | Stothers |
| 5,692,708 | A | 12/1997 | Coleman et al. |
| 5,768,124 | A | 6/1998 | Stothers et al. |
| 5,901,059 | A | 5/1999 | Tao et al. |
| 5,936,792 | A | 8/1999 | Yamaguchi et al. |
| 5,943,660 | A | 8/1999 | Lewis et al. |
| 5,959,861 | A | 9/1999 | Kaneko |
| 6,026,793 | A | 2/2000 | Yasui et al. |
| 6,055,524 | A | 4/2000 | Cheng |
| 6,092,919 | A | 7/2000 | Calise et al. |
| 6,230,062 | B1 | 5/2001 | Shah |
| 6,404,581 | B1 | 6/2002 | Shah |
| 6,618,631 | B1 | 9/2003 | Johnson et al. |
| 6,721,609 | B1 | 4/2004 | Wojsznis et al. |
| 7,218,973 | B2 * | 5/2007 | Johnson et al. ............... 700/28 |
| 7,277,764 | B2 * | 10/2007 | Hovakimyan et al. ......... 700/28 |

FOREIGN PATENT DOCUMENTS

| | | |
|---|---|---|
| WO | WO 01/82007 A2 | 11/2001 |
| WO | WO 01/92974 A2 | 12/2001 |

OTHER PUBLICATIONS

Naira Hov Ak1myan, Flavio Nardi, Anthony Calise, Nakwan Kim, "Adaptive Output Feedback Control of Uncertain Nonlinear Systems Using Single Hidden Layer Neural Networks," IEEE Transactions on Neural Networks, vol. 13, No. 6, Nov. 2002.

Naira Hov Akimyan, Anthony Calise, Venkatesh Madyastha, "An Adaptive Observer Design Methodology for Bounded Nonlinear Processes," Proceedings of the 41th IEEE Conference on Decision and Control, Dec. 2002, pp. 4700-4705, Las Vegas, Nevada.

Sharma, M., Calise. A.J., "Neural Network Augmentation of Existing Linear Controllers," AIAA Guidance. Navigation, and Control Conference, Aug. 6-9, 2001, pp. 747-755, Montreal; Canada.

Calise, A.J.• B.-J. Yang, J. Crajg. "Augmentation of an Existing Linear Controller With an Adaptive Element", Book of Abstracts: Wednesday Sessions, ACC 2002.

E. Lavrestsky, N. Hovak1myan, A. Calise, "Upper Bounds for Approximation of Continuous-Time Dynamics Using Delayed Outputs and Feedforward Neural Network," IEEE Transactions on Automatic Central, Sep. 2003, pp. 1606-1610, vol. 48, No. 9.

Calise, A.J., "A Method for Adding Adaptation to an Existing Control System," Invention Disclosure, Sep. 15, 2001.

International Search Report dated Jul. 11, 2005 for corresponding International Application No. 10 PCT/US 2003/39384 filed Dec. 9, 2003.

Search and Examination Report from corresponding British Application No. GB0608601.1 dated Jun. 19, 2006.

Search and Examination Report from corresponding British Application No. GB0608542.1 dated Jun. 15, 2006.

J. Horn: "Feedback-Linearization using Neural Process Models" Proceedings of the 9th International Conference on Artificial Neural Networks, vol. 1, Sep. 7, 1999, pp. 37-42, XP001059447 UK p. 37, right-hand column, line 1—p. 38, right-hand column, line 3.

Y. Zhang et al: "Stable Neural Controller Design for Unknown Nonlinear Systems Using Backstepping," Proceedings of the 1999 American Control Conference, vol. 2, Jun. 2, 1999, pp. 1067-1071, XPO10344848 USA p. 1067, left-hand column, line 60 -p. 1068, right-hand column, line 37.

K. Hasibi: "Implemenation of Feedbcak Linearizable Controllers" Proceedings of the SPIE, vol. 1709, 1992, pp. 541-547, XPOOI059643 USA p. 541, line 45 -p. 542, line 32.

I. Egemen Tezcan et al: "Disturbance Attenuating Adaptive Controllers for Parameteric Strict Feedback Nonlinear Systems With Output Measurements" Transactions of the ASME, vol. 121, No. 1, Mar. 1999, pp. 48-57, XPOOI059617 USA p. 49, left-hand column, 1ine 46 -p. 50, left-hand column, line 57.

Podsiadlo P et al: "Output feedback adaptive control of non-affine MIMO systems" Motion Control Proceedings, 1993., Asia-Pacific Workshop on Advances in Singapore Jul. 15-16, 1993, New York, NY, USA, IEEE, Jul. 15, 1993, pp. 159-164, XPOI0113424 ISBN: 0-7803-1223-6 the whole document.

* cited by examiner

ADAPTIVE OUTPUT FEEDBACK APPARATUSES AND METHODS CAPABLE OF CONTROLLING A NON-MINIMUM PHASE SYSTEM

STATEMENT OF U.S. GOVERNMENT RIGHTS IN THE INVENTION

This invention was developed under Air Force Office of Scientific Research (AFOSR) Contract No. F4960-01-1-0024. The U.S. Government has certain rights in the invention.

TECHNICAL FIELD

This invention relates generally to adaptive control systems using output feedback to perform control of uncertain nonlinear plants such as an aircraft, spacecraft, missile, munition, satellite, robot, ground vehicle, underwater vehicle, surface ship, chemical process, industrial process, weather system, economic system, etc., and any subsystem thereof.

BACKGROUND ART

One of the most important problems in control is that of controlling an uncertain system in order to have its output track a given reference signal. Previously developed control system design methods that apply to this class of uncertain systems include (1) designs based on the theory of differential games and $L_2$-gain analysis; (2) geometric methods; (3) methods for adaptive design of observers and output feedback controllers; (4) methods for employing high gain observers; (5) backstepping algorithms; (6) input-to-state stability method; (7) methods for decentralized stabilization of interconnected systems, among others.

It is of interest to apply a systematic design approach for controlling system outputs in the presence of structured uncertainties, such as unmodeled dynamics and disturbances. While for linear systems stabilization and tracking can always be achieved by output feedback using standard design methods such as pole placement, separation principle, or linear quadratic regulation (LQR)., for nonlinear systems the task is often difficult. Most of the nonlinear control methods, robust or adaptive, impose the assumption on asymptotic stability of the zero dynamics and thus are limited to minimum phase systems. It would be desirable to provide apparatuses and methods for adaptive output feedback control of non-mimimum phase uncertain nonlinear systems

DISCLOSURE OF THE INVENTION

This invention overcomes the limitations of previous apparatuses and methods in that it provides the capability to stabilize and control a non-minimum phase, nonlinear plant with unmodeled dynamics and/or parametric uncertainty through the use of adaptive output feedback.

In accordance with one embodiment of the invention, an apparatus comprises a reference model unit and an adaptive control unit for augmenting a nominal controller for controlling a plant. The reference model unit can comprises a reference controller that is identical to the nominal controller, and is used to control a plant model upon which the control laws of the nominal controller and reference controller are based. The reference model unit can difference the reference model output signal $y_m$ and a commanded output signal $y_c$ to generate reference controller input signal $y_c - y_m$ provided to the reference controller. Based on this signal, the reference controller generates a reference controller generates a reference controller signal $u_{ec}(y_m)$ and reference controller state signal $x_{cm}$. The nominal controller is coupled to a combining node that receives the commanded output signal $y_c$ and the plant output signal y, and generates a reference controller input signal $y_c - y_m$ based thereon. The reference controller generates the nominal controller signal $u_{ec}(y)$ and the reference controller state signal $x_{cm}$ based on the reference controller input signal $y_c - y_m$.

The apparatus can comprise a combining unit coupled to receive and difference the plant output signal y and the reference model output signal $y_m$ to generate an output error signal $\tilde{y}$. The output error signal $\tilde{y}$ does not explicitly contain all of the plant states, but is a function thereof. The adaptive control unit is coupled to receive the output error signal $\tilde{y}$. More specifically, the adaptive control unit can comprise an error observer that receives the output error signal $\tilde{y}$. The adaptive control unit can comprise a combining unit that receives the nominal controller state signal $x_c$ and the reference controller state signal $x_{cm}$, and generates a controller state error signal $x_{cm} - x_c$ based thereon. This combining unit provides the controller state error signal $x_{cm} - x_c$ to the error observer. Based on the output error signal $\tilde{y}$ and the controller state error signal $x_{cm} - x_c$, the error observer generates the observed error signal $\hat{E}$. The adaptive control unit can comprise a neural network coupled to receive the observed error signal $\hat{E}$ for use in updating its connection weights. As inputs the neural network can be coupled to receive the plant output signal y and the plant control signal u. The adaptive control unit can comprise a time delay unit coupled to receive and delay the plant output signal y and the plant control signal u to generate the delayed plant output signal $y_d$ and the delayed plant control signal $u_d$, respectively, which can also be provided to the neural network as inputs. The neural network can be one of a variety of forms, including a single hidden layer network. Based on the plant output signal y, the plant control signal u, and optionally also the delayed plant output signal $y_d$ and the delayed plant control signal $u_d$, as well as the observed error signal $\hat{E}$ used to update connection weights M,N, the neural network generates the neural network control signal $u_{NN}$ for use canceling the effect of differences between the plant model and the actual plant in control of the plant. The neural network control signal $u_{NN}$ can be output from the adaptive control unit as an adaptive control signal $u_{ad}$. Alternatively, the adaptive control unit can further comprise an auxiliary controller coupled to receive the output error signal $\tilde{y}$ and the controller state error signal $x_{cm} - x_c$. The auxiliary controller can be linear. Based on its received signals, the auxiliary controller generates an auxiliary controller signal $u_{dc}$. The adaptive control unit can comprise a combining unit coupled to receive and combine the auxiliary controller signal $u_{dc}$ and the neural network control signal $u_{NN}$ to generate the adaptive control signal $u_{ad}$. The output of the auxiliary controller can also be provided to the error observer for use in generating the observed error signal $\hat{E}$. The apparatus can further comprise a combining unit coupled to receive and difference the nominal controller signal $u_{ec}(y_m)$ and the adaptive control signal $u_{ad}$, to generate the plant control signal u. This combining unit can be coupled to provide the plant control signal u to the plant for use in its control.

In one embodiment, a method of the invention can comprise steps mirroring the functions performed by one or more of the nominal controller, reference control unit, the adaptive control unit, the combining units, and optionally other elements herein described. Other apparatuses and methods are herein disclosed.

BRIEF DESCRIPTION OF THE DRAWINGS

The invention is better understood by reading the following detailed description of an exemplary embodiment in conjunction with the accompanying drawings, wherein.

BEST MODE FOR CARRYING OUT THE INVENTION

Figure 1:
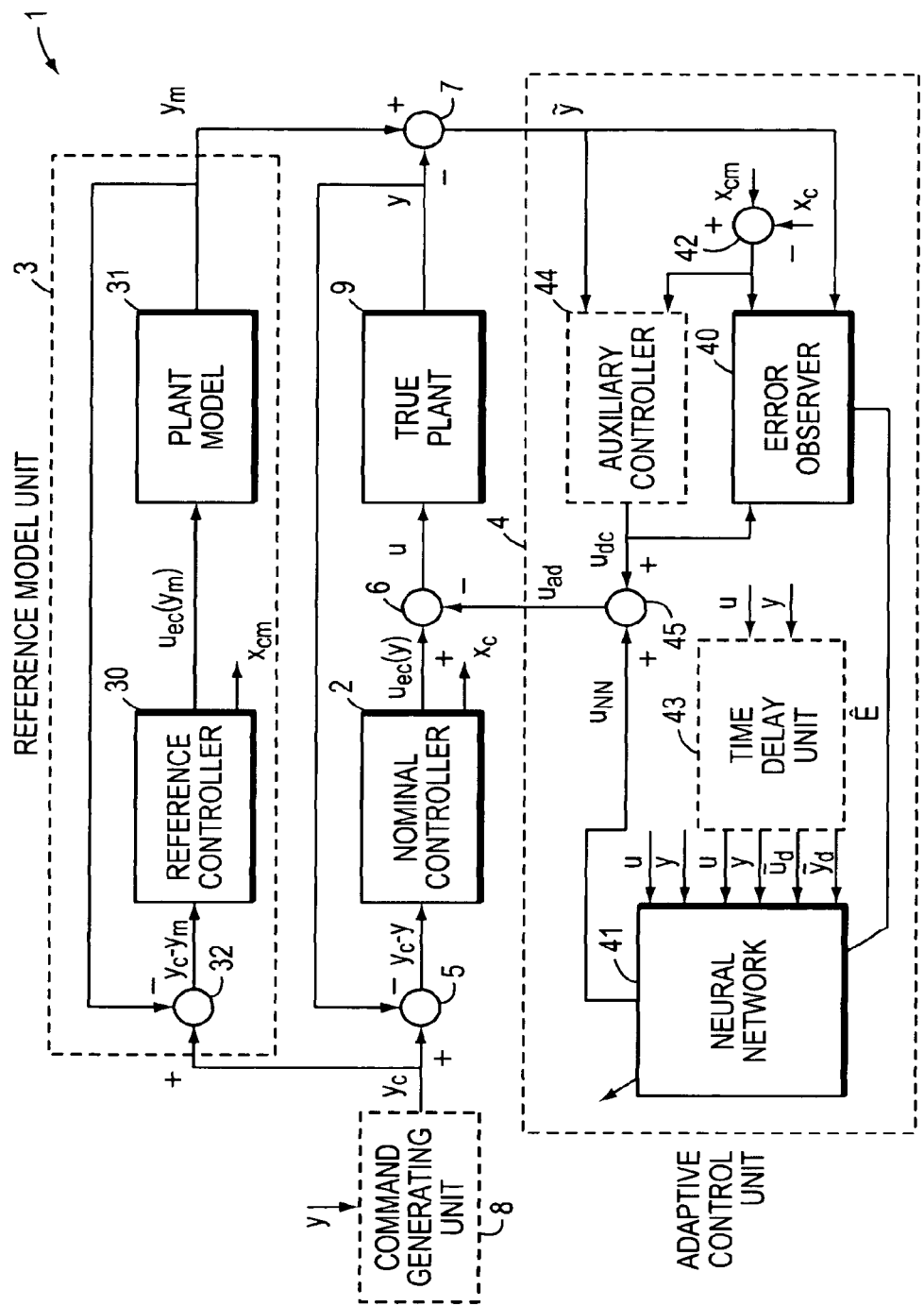
FIG. 1 is a block diagram of a system in accordance with the invention, including a nominal controller, reference model unit, an adaptive output unit, and combining units, providing the capability to stabilize and control a non-minimum phase, nonlinear plant with unmodeled dynamics and/or parametric uncertainty through the use of adaptive output feedback.

As used herein, the following terms have the following definitions:

"Actuator" can be virtually any device capable of affecting the state of a plant to control one or more degrees of freedom thereof. Such actuator can be a motor, motor-driven screw, a hydraulic cylinder, a pump or valve controlling a stream of air, a thermal heater, a compressor or suction generator, or other device.

"Adaptive control system" means a control system having the capability to adapt to changes in a controlled plant or its environment over time.

"And/or" means either one or both of the elements before and after this term. Hence, "A and/or B" means "A" or "B" or "A and B".

"Coupled" means connected to receive a signal whether in analog and/or digital form, either directly from an element or indirectly passed through two or more elements. Furthermore, the term "coupled" can refer to passing of signals or data values between different segments or objects of code implemented in a processor-based system.

"Operator" can be a human or computer, that receives and input and generates and output based on the current and past history of the input., for example, senses a plant output using a plant output signal, and generates a commanded state signal to control the plant.

"Memory" can be a random-access memory (RAM), read-only memory (ROM), erasable read-only programmable memory (EPROM), or other memory device capable of storing a control program and data executable by a processor.

"Plant" refers to a system controlled by a control system. For example, the plant can be an aircraft, spacecraft, space-launch vehicle, satellite, missile, guided munition, automobile, or other vehicle. The plant can also be a robot, or a pointing or orientation system such as a satellite orientation system to orient power-generation panels, a transceiver, or a docking mechanism. Such plant can also be a braking system, an engine, a transmission, or an active suspension, or other vehicle subsystem. The plant can be a manufacturing facility or a power generation facility. In general, the plant could be virtually any controllable system.

"Processor" can be a microprocessor such as a Xeon® or Pentium® brand microprocessor produced by Intel® Corporation, an Athlon® brand microprocessor commercially available from AMD® Corporation, Sunnyvale, Calif., which can operate at one (1) megahertz or more, a microcontroller, a field programmable gate array ("FPGA"), a programmable logic array ("PLA"), a programmed array logic ("PAL"), or other type of data processing or computing device.

"Relative degree" applies to a regulated variable (such as plant output signal y) and corresponds to the number of times the variable must be differentiated with respect to time before an explicit dependence on the control variable (such as the command control signal $\delta_c$) is revealed.

"Sensor" can be virtually any device(s) for sensing a degree of freedom of a plant's state, whether alone or in combination with one or more other sensors. The sensor can be virtually any device suitable for sensing information regarding a plant's state. For example, the sensor could be a gyroscope for detecting orientation of a vehicle such as an aircraft, i.e., pitch or roll attitudes or side slip. The sensor can also be a temperature or pressure sensor, a position, velocity, or inertial sensor.

"(s)" means one or more of the thing meant by the word preceding "(s)". Thus, basis function(s) means one or more basis functions.

"State" refers to a property of a plant to be controlled which is sufficient to completely define the condition of the plant at any time' instant. For example, elements of the state can be a position, velocity, acceleration, mass, energy, temperature, pressure, volume, etc. of an object associated with a plant that is to be controlled.

"State feedback" pertains to a situation in which the entire state of the plant can be sensed and used to control the plant through feedback.

"Variable" refers to any signal that can be changed independently of the plant states, such as the control variable, or that dependent upon time either directly, or indirectly because it depends upon plant states that are time varying, such as the output variable.

The following detailed description of the present invention is provided as an enabling teaching of the invention in its best, currently known embodiment. Those skilled in the relevant art will recognize that many changes can be made to the embodiment described, while still obtaining the beneficial results of the present invention. It will also be apparent that some of the desired benefits of the present invention can be obtained by selecting some of the features of the present invention without using other features. Accordingly, those who work in the art will recognize that many modifications and adaptations to the present invention are possible and may even be desirable in certain circumstances, and are a part of the present invention. Thus, the following description is provided as illustrative of the principles of the present invention and not in limitation thereof, since the scope of the present invention is defined by the claims.

Field 1 is block diagram of a system 1 in accordance with the invention. System 1 comprises a nominal controller 2, a reference model unit 3, and an adaptive control unit 4. The system 1 can be a non-minimum phase system, although the invention can as well be applied to minimum phase systems.

The system 1 can include combining units 5, 6, 7. In addition, the system 1 can comprise a command generating unit 8.

Central to the system 1 is a plant 9, which can be an aircraft, spacecraft, missile, munition, satellite, robot, ground vehicle, underwater vehicle, surface ship, chemical process, industrial process, weather system, economic system, etc., and any subsystem of such plants. For example, if the plant is an aircraft, then the subsystem can be a thrust vector system, engine, helicopter rotor control system, etc. Of particular interest are plants 9 which include uncertain parameters in their dynamics and/or unmodeled, non-linear dynamics. As will become subsequently more clear, the system 1 is particularly effective in stably controlling such classes of plants.

The reference model unit 3 comprises a reference controller 30 and a plant model 31. The reference controller 30 can be, and preferably is, identical to the nominal controller 2. Thus, both the nominal controller 2 and the reference controller 30 implement the same control laws based on the plant model 31. Plant model 31 is an approximate dynamic model of the plant 9. The nominal controller 2 is the stabilizing controller for the plant model 31. The combining unit 5 is coupled to receive the plant output signal y and the commanded output signal $y_c$ to produce the commanded output error signal $y_c$-y. The nominal controller 2 is coupled to receive the output error signal $y_c$-y and uses such signal to generate a nominal controller signal $u_{ec}(y)$ and a nominal controller state signal $x_c$. Nominal controller 2 is implemented as a stabilizing controller such as can be defined by equation (3) hereinafter. However, it should be understood that other stabilizing control designs well-known to those of ordinary skill in the art could be substituted for that equation (3). The combination unit 6 is coupled to receive the nominal controller signal $u_{ec}(y)$. In addition, the combination unit 6 is coupled to receive the adaptive controller signal $u_{ad}$ from the adaptive control unit 4. The combination unit 6 generates the plant control signal u based on the nominal controller signal $u_{ec}(y)$ and the adaptive control signal $u_{ad}$. More specifically, the combination unit 6 can difference the nominal controller signal $u_{ec}(y)$ and the adaptive control signal $u_{ad}$ to produce the plant control signal u. The plant 9 is coupled to receive the plant control signal u which controls the plant so that the plant output signal y tracks the commanded output signal $y_c$. The commanded output signal $y_c$ can be generated by a command generating unit 8 including a human or computer operator, based on the plant output signal y.

Returning to consideration of the reference model unit 3, the combination unit 32 is coupled to receive the commanded output signal $y_c$. In addition, the combination unit 32 is coupled to receive the plant model output signal $y_m$. The combination unit 32 combines, or more specifically differences, the commanded output signal $y_c$ and the plant model output signal $y_m$, to generate the reference controller input signal $y_c$-$y_m$. The reference controller 30 is coupled to receive the reference controller input signal $y_c$-$y_m$ and generates the reference controller signal $u_{ec}(y_m)$ and the first controller state signal $x_{cm}$ based on the reference controller input signal $y_c$-$y_m$. The plant model 31 is coupled to receive the nominal controller signal $u_{ec}(y_m)$ and generates the reference model output signal $y_m$ based thereon. The combination unit 7 is coupled to receive the plant output signal y and the reference model output signal $y_m$, and generates the output error signal $\tilde{y}$ based on the signals. The plant output error signal $\tilde{y}$ is a function of all states of the plant 9, although not all such states can be derived from such signal.

The adaptive control unit 4 comprises an error observer 40 and a neural network 41. In addition, the adaptive control unit 4 can comprise a combination unit 42, a time-delay unit 43, an auxiliary controller 44, and a combination unit 45. The error observer 40 is coupled to receive the plant output signal $\tilde{y}$. The combination unit 42 is coupled to receive the nominal controller state signal $x_c$ and the reference controller state signal $x_{cm}$. The combination unit 42 generates controller state error signal $x_{cm}$-$x_c$ based on the nominal controller state signal $x_c$ and the reference controller state signal $x_{cm}$. The error observer 40 is coupled to receive the controller state error signal $x_{cm}$-$x_c$. The error observer 40 generates the observed error signal $\hat{E}$ based on the plant output error signal $\tilde{y}$ and the controllers state error signal $x_{cm}$-$x_c$. The error observer 40 effectively estimates the unavailable error states of the plant 9 so that such errors are taken into account in generating the adaptive control signal $u_{ad}$. Recall that the plant output error signal $\tilde{y}$ is a function of all states of the plant 9, although not all such states can be determined from such signal. Therefore, the error observer 40 generates the observed error signal $\hat{E}$ to include estimates of the error(s) in the unavailable state(s) of the plant 9, in addition to error(s) for those state(s) that are available from the plant output error signal $\tilde{y}$. Neural network 41 is coupled to receive the plant control signal u and the plant output signal y. It can be coupled to receive such plant control signal u and the plant output signal y from the combining unit 6 and plant 9, respectively. Alternatively, if the time delay unit 43 is used, the neural network 41 can be coupled to receive the plant control signal u and the plant output signal y from the time delay unit 43, which is coupled to receive such signals from the combining unit 6 and plant 9, respectively. In addition, the neural network 41 can receive as inputs a delayed plant control signal $u_d$ and a delayed plant output signal $y_d$. More specifically, the time delay unit 43 can be coupled to receive the plant control signal u and the plant output signal y and can generate the delayed plant control signal $u_d$ and the delayed plant output signal $y_d$. The time delay unit 43 is coupled to provide the delayed plant control signal $u_d$ and the delayed plant output signal $y_d$ as inputs to the neural network 41. By way of example and not limitation, the neural network 41 can implemented as a three layer network, with an input layer, hidden layer, and output layer of neurons. Thus, the neural network 41 receives at its input layer the plant control signal u and the plant output signal y, and optionally also the delayed plant control signal $u_d$ and the delayed plant output signal $y_d$. The neural network 41 is also coupled to receive the observed error signal $\hat{E}$ which adjusts the connection weights M,N associated with the functions $\sigma(\cdot)$ of the neural network neurons. The neural network's input signals u, y, $u_d$, $y_d$ excite the neurons of the neural network 41, and their output signals are weighted with connection weights M,N between the neurons to generate the neural network output signal $u_{NN}$. The neural network output signal $u_{NN}$ can be output from the adaptive control unit 4 as the adaptive control signal $u_{ad}$. In this case, the combining unit 45 is not required in the adaptive control unit 4, as the output of the neural network 41 can be coupled directly to the combining unit 45. The weight update law of the neural network 41 that is adapted by the observed error signal $\hat{E}$ is designed to ensure that all signals within the neural network 41 remain bounded. For example, a Lyupanov stability analysis can be used to derive a bounded weight update law. This output feedback design of the neural network 41 provides for generation of the neural network output signal $u_{NN}$ so that parametric uncertainty and/or unmodeled dynamics of the plant 9 relative to the plant model 31 can be compensated in the plant control signal u used to control the plant 9.

Optionally, an auxiliary controller 44 can be used to enhance nominal controller 2 to achieve improved tracking performance with relatively small ultimate bounds. For non-minimum phase systems, this is difficult to accomplish even for linear systems. To reduce ultimate bounds to improve tracking performance between the commanded output signal $y_c$ and the plant output signal y, the nominal controller 2 can be augmented by the auxiliary controller 44. For example, auxiliary controller 44 can be a linear controller. Auxiliary controller 44 is coupled to receive the output error signal ỹ and the controller state error signal $x_{cm}-x_c$ and uses these signals to generate the auxiliary controller signal $u_{dc}$. The combination unit 45 is coupled to receive the auxiliary control signal $u_{dc}$ and the neural network output signal $u_{NN}$, and combines these signals to generate the adaptive control signal $u_{ad}$. The error observer 40 is coupled to receive the auxiliary controller signal $u_{dc}$. The error observer 40 uses the auxiliary controller signal $u_{dc}$ to generate the observed error signal Ê.

Figure 2:
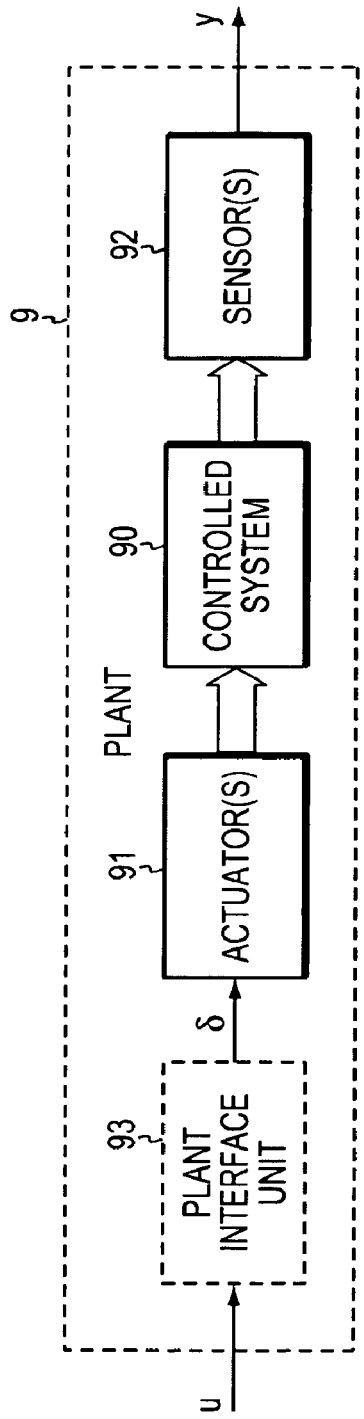
FIG. 2 is a relative detailed block diagram of the plant of FIG. 1 receiving a plant control signal u and generating a plant output signal y based thereon.

FIG. 2 is a more detailed diagram of the plant 9 indicating various elements that can be included therein. More specifically, the plant 9 comprises of a control system 90, actuator(s) 91 for a controlling state(s) of the controlled system 90, and sensor(s) 92 which sense the output(s) which are a function of all states of the plant, including state(s) which cannot be sensed and are therefore unavailable. Based on the sensed output(s) of the controlled system 90, the sensor(s) 92 generate the plant output signal y. The actuator(s) 91 physically controls the control system 90 based on the plant control signal u, and thus can be coupled to the combining unit 6 to receive such signal. As an optional element, the plant 9 can comprise the plant interface unit 93. The plant interface unit 93 can be used to perform control allocation to generate actuator signal(s) δ to physically control the plant 9. For example, if the plant 9 is an aircraft, the plant control signal u can specify a target roll angle θ. The plant interface unit 93 can receive the plant control signal u indicating the target roll angle θ, and generate the actuator control signal(s) δ to the actuator(s) 91, which can be control surfaces of the aircraft, to obtain the target roll angle θ for the control system 90, in this case the remaining portion of the aircraft not including the units 91, 92, 93.

Figure 3:
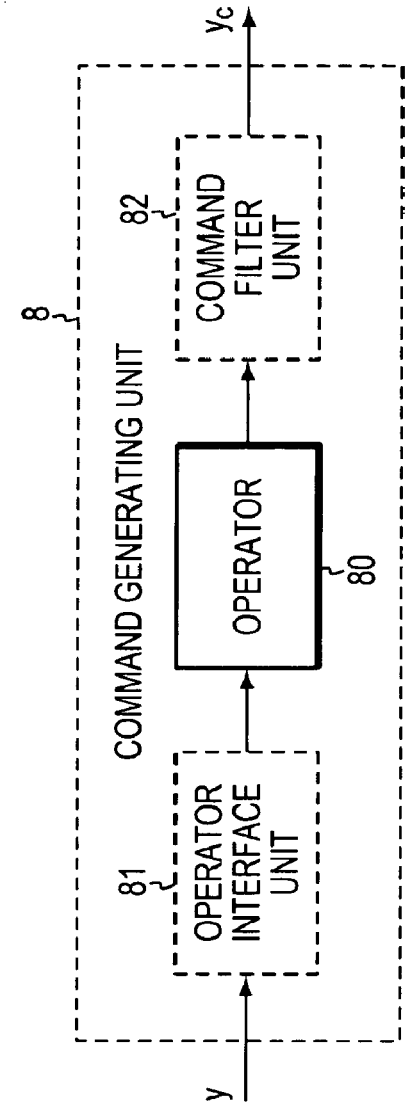
FIG. 3 is a relatively detailed view of a command generating unit for use in generating a commanded output signal $y_c$ based on a plant output signal y.

Thus, the plant control signal u can be used to directly control the actuator(s) 91, and/or can be allocated through the plant interface unit 93. FIG. 3 is a relatively detailed diagram of the command generating unit 8. The command generating unit 8 comprises an operator 80, and optionally also an operator unit interface unit 81, and a command filter unit 82. The operator 80 can be a human or computer for generating a commanded output signal $y_c$ based on the plant output signal y. The operator interface unit 81 can be a network interface card or user interface of a computer, providing a display or signal comprehensible to the operator 80 which indicates the plants output(s). The operator 80 can be coupled or can interface with the command filter unit 82 which imparts desirable characteristics such as position, rate, and bandwidth limits on the control signal generated by the operator 80, to produce the commanded output signal $y_c$.

It should be understood by those who are skilled in the art that the block diagram at FIG. 1 can be implemented in analog, digital, or a hybrid form. Thus, the nominal controller 2, reference model unit 3, the adaptive control uit 4, combining units 5, 6, 7, 32, 42, 45, and the command generating unit 8, can be implemented wholly or partially as electronic and/or optical components, for example.

Figure 4:
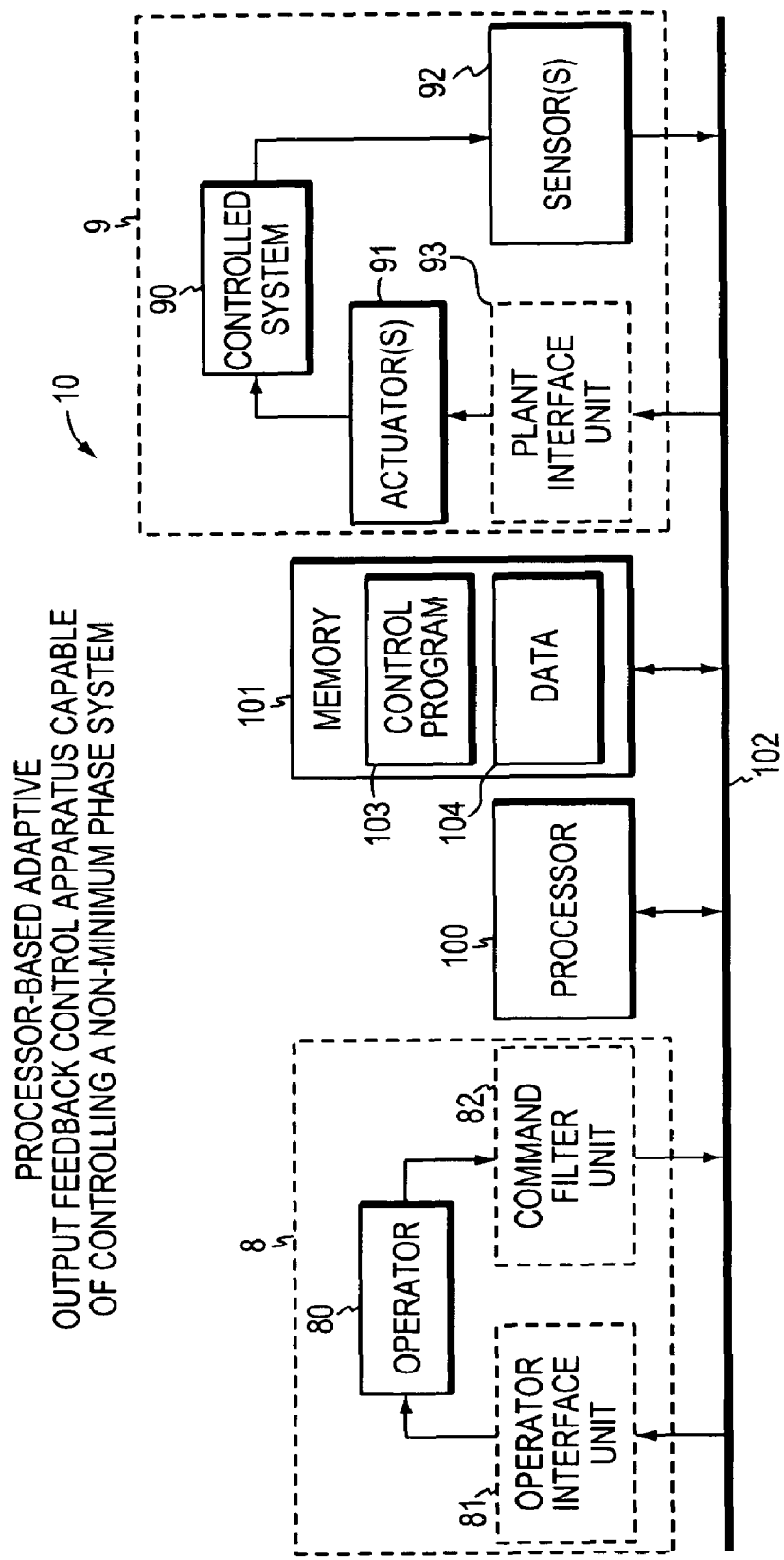
FIG. 4 is a block diagram of an embodiment of the system in accordance with the invention implemented by execution of a control program by a processor.

FIG. 4 indicates an implementation of the system 1 in accordance with one embodiment of the invention, in which a processor executes one or more of the elements of FIG. 1 as a control program. The system 1 of FIG. 4 comprises a processor 100 and memory 101 coupled via the bus 102. The system 1 can comprise the command generating unit 8 and the plant 9. The memory 101 stores a control program 103 and data 104 generated by the processor 100 as its executes, as well as having stored constants. The control program 103 comprises software code that can be executed by the proddcessor 100 to implement functions of the nominal controller 2, reference model unit 3, adaptive control unit 4, and the combining units 5, 6, 7. The control program 103 can be executed by the processor 100 to perform the functions of the flow chart of FIGS. 6 and 7.

Figure 5:
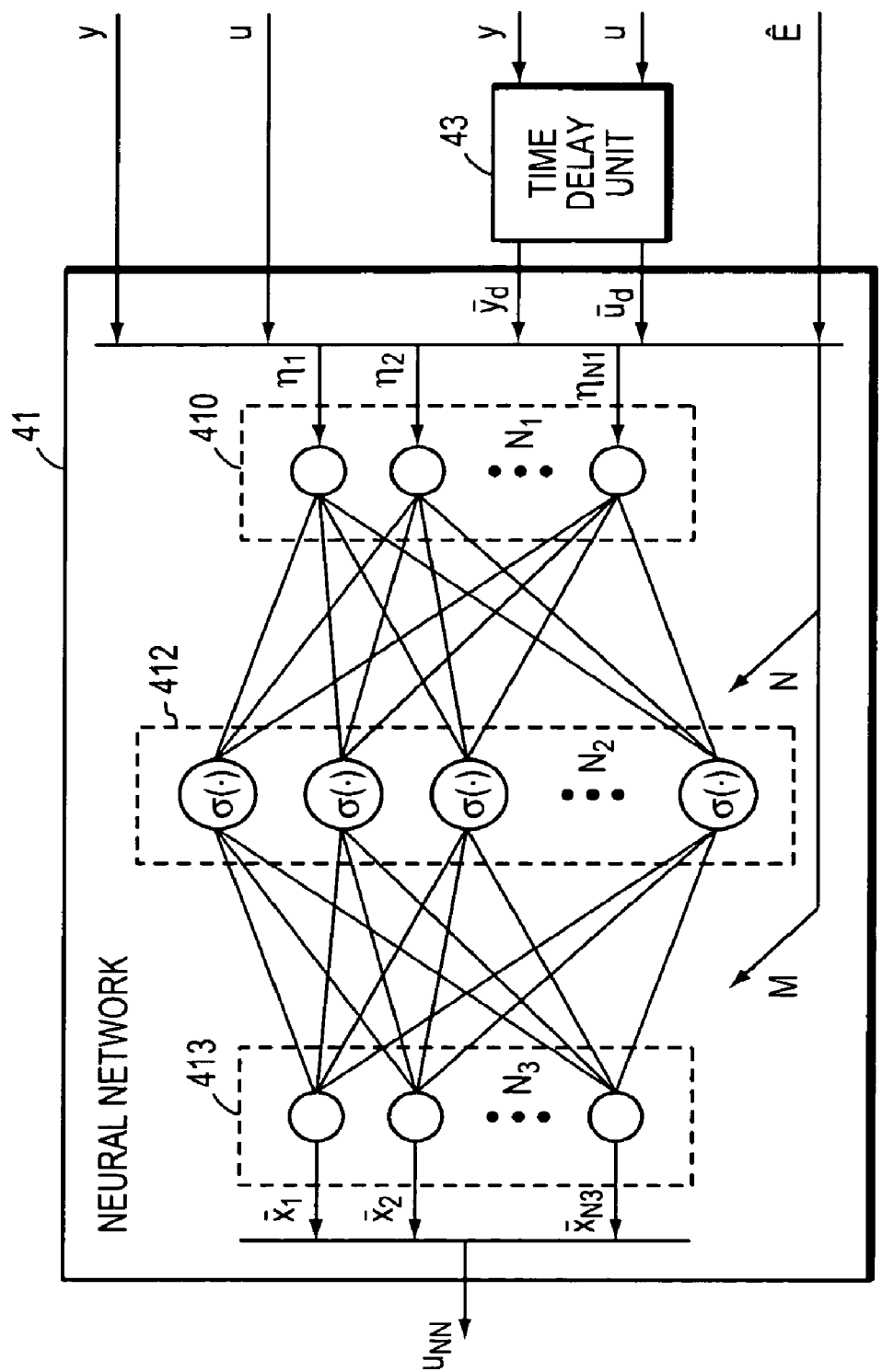
FIG. 5 is a relatively detailed diagram of the neural network and time delay unit in accordance with the invention.

FIG. 5 is a view of an exemplary embodiment of the neural network 41. In FIG. 5, the neural network 41 comprises input layer 410 having distribution nodes, a hidden layer 411 of neurons, and the output layer 412 of summing nodes. The input layer 410 is coupled to receive the plant output signal y and the plant control signal u. The neural network 41 is also coupled to receive delayed value(s) $y_d$ of the plant output signal y, and delayed value(s) $u_d$ of the control signal u, from the delay unit 43. Signals y, u, $y_d$, $u_d$, are input to the layer 410 as signals $\eta_1$ through $\eta_{N1}$, $N_1$ being a positive integer equal to the number of nodes in the input layer 410. The output signals of the distribution nodes 410 are weighted by connection weights N which are updated using the observed error signal Ê from the error observer 40. The neurons of the hidden layer 411 are coupled to receive the signals $\eta_1$ through $\eta_{N1}$ weighted by the connection weights M. Based on the M-weighted signals $\eta_1$ through $\eta_{N1}$, the $N_2$ neurons of the hidden layer 411 operate with respective functions σ(·) on these signals to produce respective output signals, $N_2$ being a positive integer. These output signals of the neurons of the hidden layer 411 are weighted by the connection weights M and output to the $N_3$ summing nodes of the output layer 412, $N_3$ being a positive integer. The summing nodes of the output layer 413 receive these signals and generate output signals $\bar{x}_1$ through $\bar{x}_{N3}$ which are the vector elements of the neural network control signal $u_{NN}$.

Figure 6:
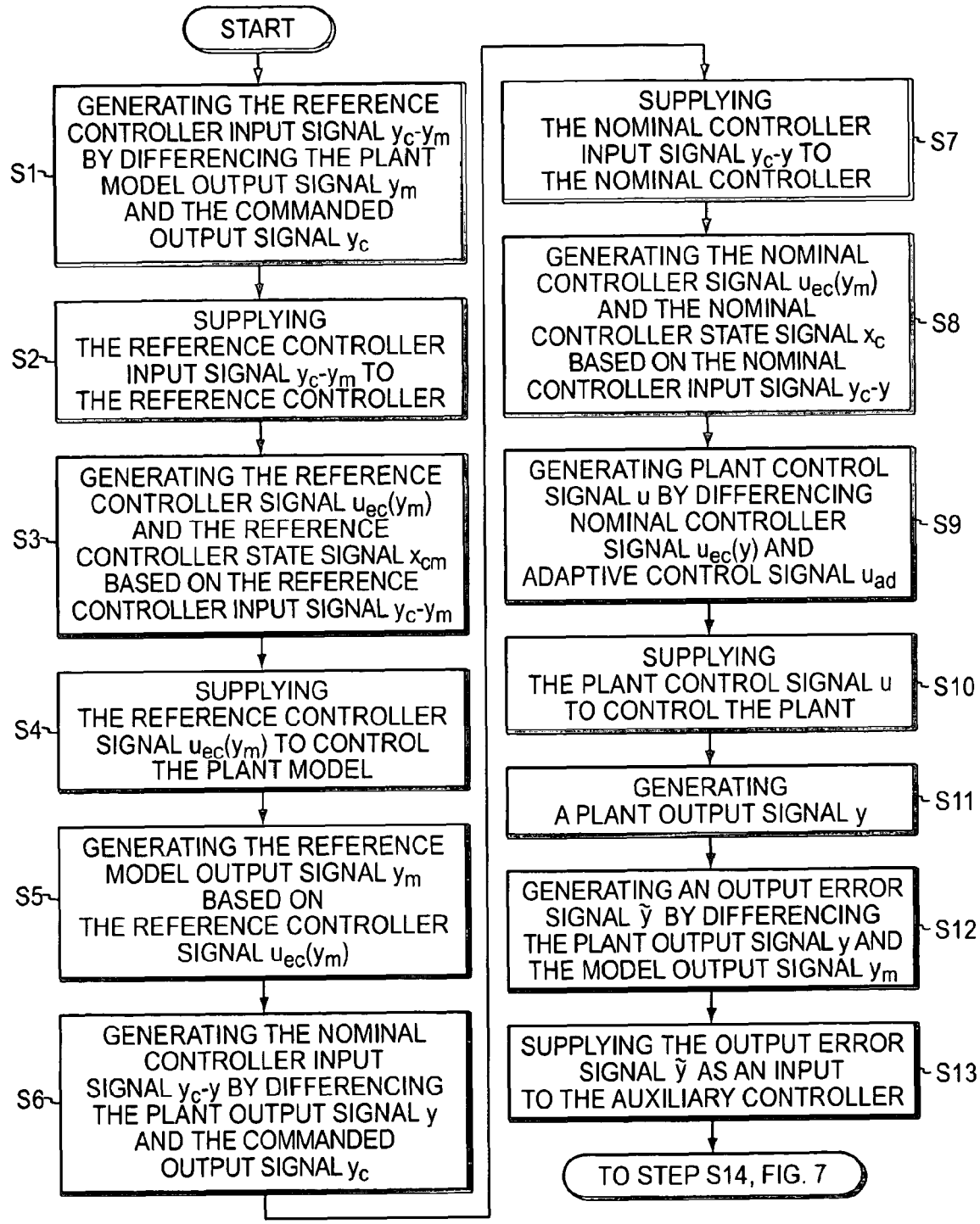
FIGS. 6 and 7 are flowcharts of an exemplary method of the invention and processing performed by the system of the invention.
Figure 7:
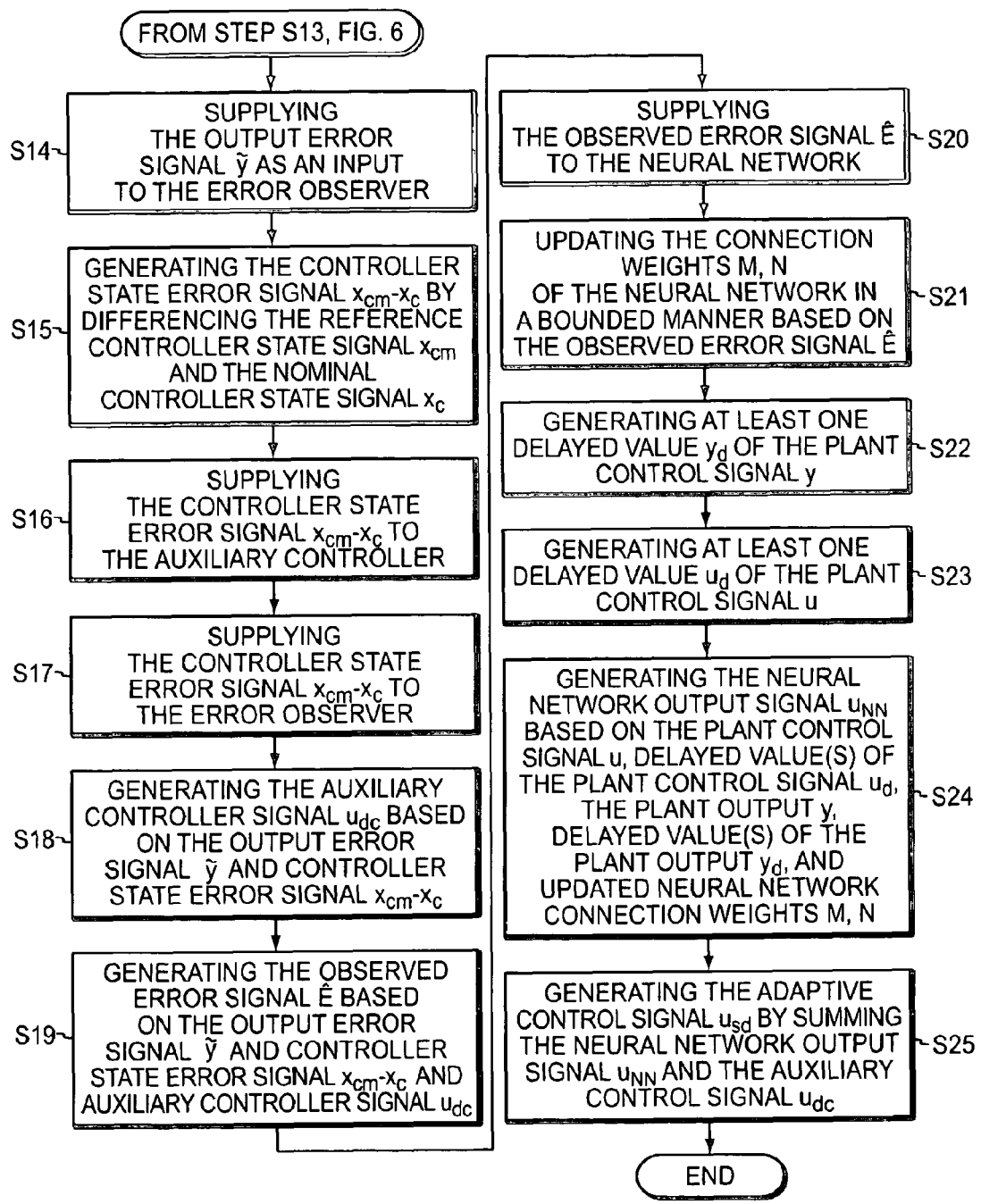

Turning to FIGS. 6 and 7, a method in accordance with an embodiment of the invention is now described. It should be noted that one or more of the elements of the system 1 can be implemented in the flowchart of FIGS. 6 and 7 by programming the control program 103 to implement such functions under execution by the processor 100. The method of FIGS. 6 and 7 begins in Step S1 in which the reference control input signal $y_c-y_m$ is generated by differencing the plant model output signal $y_m$ and the command output signal $y_c$. In Step S2, the reference controller input signal $y_c-y_m$ is supplied to the reference controller 30. In Step S3, the reference controller signal $u_{ec}(y_m)$ and the reference controller state signal $x_{cm}$ are generated based on the reference controller input signal $y_c-y_m$. In Step S4, the reference controller signal $u_{ec}(y_m)$ is supplied to control the plant model 31. In Step S5, reference model output signal $y_m$ is generated based on the reference controller signal $u_{ec}(y_m)$. In Step S6, the nominal controller input signal $y_c-y$ is generated by differencing the plant output signal y and the commanded output $y_c$. In Step S7, the nominal controller input signal $y_c-y$ is supplied to the nominal controller 2. In Step S8, the nominal controller signal $u_{ec}(y)$ and the nominal controller state signal $x_c$ is generated based on the nominal controller input signal $y_c-y$. In Step S9, the plant control signal u is generated by differencing the nominal controller signal $u_{ec}(y)$ and the adaptive control signal $u_{ad}$. In Step S10, the plant control signal u is supplied to control the plant. In Step S11, the output(s) of the plant 9 is sensed to generate a plant output signal ỹ. In Step S12, the output error signal ỹ is generated by differencing the plant output signal y and the model output signal $y_m$. In Step S13, the output error signal ỹ is supplied as an input to the auxiliary controller 44. In Step S14 of FIG. 7, output error signal ỹ is supplied as an input to the error observer 40. In Step S15, the controller state error signal $x_{cm}-x_c$ is generated by differencing the reference controller state signal $x_{cm}$ and the nominal controller state signal $x_c$. In Step S16, the controller state error signal $x_{cm}-x_c$ is supplied to the auxiliary controller 40. In Step S17, the controller state error signal $x_{cm}-x_c$ is supplied to the error observer 40. In Step S18, the auxiliary controller signal $u_{dc}$ is generated based on the output signal ỹ and the controller state error signal $x_{cm}-x_c$. In Step S19, the observed error signal Ê is generated based on the plant output signal ỹ, the controller state error signal $x_{cm}-x_c$, and the auxiliary controller signal $u_{dc}$. In Step S20, the observed error signal Ê supplied to the neural network 41. In Step S21, connection weights M,N of the neural-network 41 are updated in a bounded manner based on the observed error signal $\hat{E}$. In Steps S22 and S23, delayed values $y_d$ and $u_d$ are generated based on the plant output signal y and the plant control signal u, respectively. In Step S24, the neural-network output signal $u_{NN}$ is generated based on the plant control signal u, plant output signal y, delayed value(s) of the plant control signal $u_d$, the plant output y, delayed value(s) of the plant output $y_d$, updated neural network connection weights M and N. In Step S25, the adaptive control signal $u_{ad}$ is generated by summing neural-network output signal $u_{NN}$ and the auxiliary control signal $u_{dc}$. After performance of Step S25, processing of the method of FIGS. 6 and 7 terminates. It should be understood by those of persons of ordinary skill in the art that the method of FIGS. 6 and 7 is generally performed repeatedly to control the plant 9, and can be repeatedly performed. Execution of the Steps S1 through S25 can be considered a control cycle of the processor 100 of FIG. 4 as it executes the control program 103 to control the plant 9. The control cycle of Steps S1 through S25 can be repeated, by way of example and not limitation, from fifty to hundred times per second.

The following is a detailed explanation of the signals used in the system 1 and a detailed explanation of their relationship to one another. Consider an observerable and stabilizable nonlinear system in the normal form:

$$\dot{z}_0 = f(z_0, x_1, \ldots, x_r)$$

$$\dot{x}_1 = x_2$$

$$\vdots$$

$$\dot{x}_{r-1} = x_r$$

$$\dot{x}_r = h(z_0, x_1, \ldots, x_r, u)$$

$$y = x_1 \qquad (1)$$

Where $z_0 \in R^{n-r}$ are the states of the internal dynamics, $u \in R^1$ and $y \in R^1$ are control and measurement variables, f and h are sufficiently smooth partially known functions, $f(0)=0, h(0)=0$, and r is the relative degree of the system. Moreover, n need not be known. The output y can be equivalently expressed as $$y = c_m^T \xi,$$

where $$c_m^T \xi = [1, 0, \ldots, 0] \in R^{1 \times r}, \xi^T \equiv [x_1, \ldots x_r], \xi \in R^r.$$

Consider the use of a linear plant model. After a suitable change of coordinates, the linear plant model can also be put in normal form:

$$\dot{z}_1 = F_0 z_1 + g_0 x_{l_1}$$

$$\dot{x}_{l_1} = x_{l_2}$$

$$\vdots$$

$$\dot{x}_{l_{r-1}} = x_{l_r}$$

$$\dot{x}_{l_r} = h_0^T z_l + a_1 x_{l_1} + \ldots + a_r x_{l_r} + bu$$

$$y_l = x_{l_1} \qquad (2)$$

where $z_l \in R^{m-r}$ are the states of the zero dynamics, and $m \leq n$ is the dimension of the plant model. Consider the following stabilizing linear controller for the dynamics in (2):

$$\dot{x}_c = A_c x_c + b_c(y_c - y)$$

$$u_{ec} = c_c^T x_c + d_c(y_c - y), \qquad (3)$$

where $x_c \in R^{n_c}$.

The plant model in (2), when regulated by (3), constitutes a reference model". Defining $$\xi_l^T \equiv [x_{l_1}, \ldots x_{l_r}]$$

and denoting $x_{cl}$ the states of the controller in (3) when applied to (2), i.e. when y is replaced by $y_l$ (3), the "reference model" can be written as:

$$\begin{bmatrix} \dot{\xi}_l \\ \dot{z}_l \\ \dot{x}_{cl} \end{bmatrix} = \begin{bmatrix} A_m - b_m d_c c_m^T & B_z & b_m c_c^T \\ g_0 c_m^T & F_0 & 0 \\ -b_c c_m^T & 0 & A_c \end{bmatrix} \begin{bmatrix} \xi_l \\ z_l \\ x_{cl} \end{bmatrix} + \begin{bmatrix} b_m d_c \\ 0 \\ b_c \end{bmatrix} y_c \qquad (4)$$

$$y_l = \begin{bmatrix} c_m & 0 & 0 \end{bmatrix} \begin{bmatrix} \xi_l \\ z_l \\ x_{cl} \end{bmatrix}$$

where $$A_m = \begin{bmatrix} 0 & 1 & 0 & \ldots \\ 0 & 0 & 1 & \ldots \\ \vdots & \vdots & \vdots & \vdots \\ a_1 & a_2 & \ldots & a_r \end{bmatrix}_{r \times r}$$

$$B_z = \begin{bmatrix} 0 \\ 0 \\ \vdots \\ h_0^T \end{bmatrix}_{r \times (m-r)}, b_m = \begin{bmatrix} 0 \\ 0 \\ \vdots \\ b \end{bmatrix}_{r \times 1} \qquad (5)$$

The dynamics in (4) can be written in the following compact form:

$$\dot{x}_l = \overline{A} x_l + \overline{b}_r y_c$$

$$y_l = \overline{c}_y^T x_l \qquad (6)$$

where $x_l \in R^{m+n_c}$ and $\overline{A}$ is Hurwitz. The objective is to augment the linear control law $u_{ec}$ in (3) with an adaptive element so that when applied to the system (1) the output y tracks $y_c$. The error dynamics for the signal $y_l - y$ are derived in the following subsection. The error dynamics are found to be similar to those derived in previous works and for which a proof of ultimate boundedness has previously been constructed, and hence are ultimately bounded. Since $y_l$ tracks $y_c$ asymptotically, boundedness of $y_l - y$ ensures that y tracks $y_c$ with bounded errors.

The adaptive control unit 4 can be design based on the following considerations. The $z_0$ dynamics in (1) can be rearranged as:

$$\dot{z}_1 = f_1(z_1, z_2, \xi), z_1 \in R^{m-r}$$

$$\dot{z}_2 = f_2(z_1, z_2, \xi), z_2 \in R^{n-m} \quad (7,8)$$

where the zero solution of $\dot{z}_2 = f_2(0, z_2, 0)$ is asymptotically stable, and the dynamics in (7) can be written as:

$$\dot{z}_1 = f_1(z_1, z_2, \xi) = F_0 z_1 + g_0 y + \Delta_2(z_1, z_2, \xi) \quad (9)$$

Where $\Delta_2 = f_1(z_1, z_2, \xi) - F_0 z_1 - g_0 y$ can be viewed as modeling error in the dynamics of $z_1$, satisfying the following upper bound:

$$\|\Delta_2\| \leq \gamma_1 \|x\| + \gamma_2, x \in \Omega_x \subset R^{m+n_c} \quad (10)$$

with known $$\gamma_1, \gamma_2 > 0 \text{ and } x \equiv [\xi^T \ z_l^T \ x_c^T]^T.$$

Equations (7-10) define the relationship between the nonlinear system in (1) and the linear model in (2), used for the design of the linear controller. In case m=n there are no $z_2$ dynamics, and the relationship in (9) implies that the zero-dynamics in (2) represent the internal dynamics of (1) up to the accuracy of $\Delta_2$. If m<n, Assumption 1 does not preclude stable dynamics in (1) that are not modeled in (2), like that of $z_2$.

The last equation of the system dynamics in (1) can be put in the following form:

$$h(z_0, x_1, \ldots, x_r, u) = h_0^T z_1 + a_1 x_1 + \ldots + a_r x_r + b(u + \Delta_1) \quad (11)$$

Where $\Delta_1$ can be viewed as the portion of the modeling error that lies in the range space of the control. Augment the linear controller in (3) with an adaptive signal:

$$u = u_{ec} - u_{NN}, \quad (12)$$

Where $u_{NN}$ is designed to approximately cancel $\Delta_1$. Notice from (12) and (11) that $\Delta_1$ depends on $u_{NN}$ through u, and that the role of $u_{NN}$ is to cancel $\Delta_1$. The following assumption introduces a sufficient condition for the existence and uniqueness of a solution for $u_{NN}$.

The mapping $u_{NN} \to \Delta_1$ is required to be a contraction, which is equivalent to requiring the conditions:

$$\text{sign}(b) = \text{sign}\left(\frac{\partial h}{\partial u}\right) \quad (13)$$

$$\left|\frac{\partial h}{\partial u}\right| / 2 < |b| < \infty$$

These conditions imply that control reversal is not permitted, and that there is a lower bound on the estimate of control effectiveness, b.

A single hidden layer neural network is used to approximate $\Delta_1$ in (11). For example, for arbitrary e*>0 there exist bounded constant weights M,N such that:

$$\Delta_1 = M^T \sigma(N^T \eta) + \epsilon(\eta), \|\epsilon(\eta)\| \leq e^*$$

where $\epsilon(\eta)$ is the neural network reconstruction error and $\eta$ is the network input vector $$\eta(t) = [1 \ \bar{u}_d^T(t) \ \bar{y}_d^T(t)]^T, \|\eta\| \leq \eta^*$$

$$\bar{u}_d^T(t) = [u(t) \ u(t-d) \ldots u(t-(n_1-r-1)d)]^T$$

$$\bar{y}_d^T(t) = [y(t) \ y(t-d) \ldots y(t-(n_1-1)d)]^T \quad (15)$$

with $n_1 \geq n$ and d>0, $\sigma$ being a vector of squashing functions $\sigma(*)$, its $i^{th}$ element being defined like $[\sigma(N^T \eta)] = \sigma[(N^T \eta)_i]$.

The adaptive signal $u_{NN}$ is designed as:

$$u_{NN} = \hat{M}^T \sigma(\hat{N}^T \eta), \quad (16)$$

Where $\hat{M}$ and $\hat{N}$ and estimates of M and N to be adaptive online.

Using (11), (8) and (9), the nonlinear system in (1) under the regulation of (12) along with (3) can be written as:

$$\dot{x} = \bar{A}x + \bar{b}_r y_c - \bar{b} u_{NN} + \Delta$$

$$\dot{z}_2 = f_2(z_2, z_1, \xi)$$

$$y = \bar{c}_y x \quad (17)$$

in which $$\bar{b} = \begin{bmatrix} b_m \\ 0 \\ 0 \end{bmatrix}, \Delta = \begin{bmatrix} \Delta_1 \\ \Delta_2 \\ 0 \end{bmatrix}, \Delta_1 = \begin{bmatrix} 0 \\ \ldots \\ b\Delta_1 \end{bmatrix}$$

With the following definition of the error vector $$E^T \equiv [(\xi_l - \xi)^T (z_l - z_1)^T (x_{cl} - x_c)^T] \quad (18)$$

Following (6) and (17), the error dynamics can be expressed as:

$$\dot{E} = \bar{A}E + \bar{b}(u_{NN} - \Delta_1) - B\Delta_2$$

$$z = \bar{C}E \quad (19)$$

where z represents the signals available for feedback:

$$z = \begin{bmatrix} y_l - y \\ x_{cl} - x_c \end{bmatrix} = \begin{bmatrix} c_m & 0 \\ 0 & I \end{bmatrix} E \quad (20)$$

and $B^T = [0 \ I \ 0], I \in R^{(m-r) \times (m-r)}$. The weight adaptation laws are similar to the ones proposed in previous works. Introduce the following linear error observer for the dynamics in (19):

$$\dot{\hat{E}} = \bar{A}\hat{E} + K(z - \hat{z})$$

$$\hat{z} = \bar{C}\hat{E} \quad (21)$$

Where K is chosen to make $\bar{A} - K\bar{C}$ stable, and the following adaptive laws:

$$\dot{\hat{M}} = -F[(\hat{\sigma} - \hat{\sigma}'\hat{N}^T \eta)\hat{E}^T P\bar{b} + k\hat{M}]$$

$$\dot{\hat{N}} = -G[\eta \hat{E}^T P\bar{b} \hat{M}^T \hat{\sigma}' + k\hat{N}] \quad (22)$$

in which F,G>0 are positive definite adaptive gain matrices, k>0 is a constant, $\hat{\sigma} \equiv \sigma(\hat{N}\eta), \hat{\sigma}'$ is the Jacobian computed at the estimates. From this point on the stability analysis laid out in previous works can be followed to prove ultimate boundedness of error signals in (19). However, it is important to point out the difference between the error dynamics in previous works and the one in (19). The error dynamics in previous works have only matched uncertainty, i.e. the forcing term therein has the form $\bar{b}(u_{NN}-\Delta_1)$. In (19), due to the possible non-minimum phase nature of the nonlinear system, the error dynamics may also involve the states of the internal dynamics, which results in unmatched uncertainty $\Delta_2$. However, equations (7-10) imply that the unmatched uncertainty satisfies a linear bound in the error norm. This type of upper bound can always be encompassed by the stability proof at the price of having larger ultimate bounds.

Specifically, if the systems in (1) and (2) are minimum phase, the conditions (7-10) are not required. The linear controller in (3) can be designed to stabilize only the $\xi_I$ dynamics in (2), thus having the closed loop system in (4) without $z_I$ states. The error vector (18) can be defined without the $z_I$-$z_1$ states, and thus the unmatched uncertainty $\Delta_2$ will not be present in the error dynamics.

In many realistic applications it is of great interest to achieve tracking performance with the smallest possible ultimate bound. For non-minimum phase systems this is hard to ensure even for linear systems. Towards this end, depending upon the particular application, the control design in (12) can be augmented by an additional linear compensator. Consider the following augmentation of the controller in (12):

$$\bar{u}=u+u_{dc}, \quad (23)$$

where u has been defined in (12), and $u_{dc}$ is a linear dynamic compensator, defined as:

$$\dot{x}_{dc}=A_{dc}x_{dc}+B_{dc}z$$
$$u_{dc}=c_{dc}^T x_{dc}+d_{dc}z. \quad (24)$$

With $\bar{u}$ defined in (23), the dynamics in (17) can be rewritten:

$$\dot{x}=\bar{A}x+\bar{b}_y y_c-\bar{b}(u_{NN}+u_{dc})+\Delta$$
$$y=\bar{c}_y x$$
$$\dot{z}_2=f_2(z_2, z_1, \xi) \quad (25)$$

Applying the controller in (24) to dynamics (25), and comparing it with the reference model of (6) leads to the following redefined error dynamics:

$$\begin{bmatrix} \dot{E} \\ \dot{x}_{dc} \end{bmatrix} = \begin{bmatrix} \bar{A}+\bar{b}d_{dc}\bar{C} & \bar{b}c_{dc} \\ B_{dc}\bar{C} & A_{dc} \end{bmatrix} \begin{bmatrix} E \\ x_{dc} \end{bmatrix} + \begin{bmatrix} \bar{b} \\ 0 \end{bmatrix}(u_{NN}-\Delta_1) - \begin{bmatrix} B \\ 0 \end{bmatrix}\Delta_2$$

That can be re-written:

$$\dot{E}_a = LE_a + \begin{bmatrix} \bar{b} \\ 0 \end{bmatrix}(u_{NN}-\Delta_1) - \begin{bmatrix} B \\ 0 \end{bmatrix}\Delta_2 \quad (26)$$

Notice that with the choice of design gains in (24) the eigenvalues of L can always be placed in the open left-half plane. The dynamics in (26) are similar to that in (19), except for the dimension of the error vector. Thus its stability analysis can be carried out along similar lines.

INDUSTRIAL APPLICABILITY

The invention has applicability in a wide range of industries, including aerospace, automotive, chemical, machine tool, robotics, marine vessels, motion control industries, to mention but a few applications of the disclosed invention.

The invention claimed is:

1. An apparatus receiving a command signal $y_c$ to control a plant, the plant generating a plant output signal y that is a function of states of the plant, the apparatus comprising:
   a nominal controller for generating a nominal control signal $u_{ec}$ to control the plant based upon a plant model of the plant in response to a difference between at least the command signal $y_c$ and the plant output signal y;
   a reference controller for generating a reference control signal $u_{ec}(y_m)$ based upon a same plant model as the nominal controller in response to a difference between at least the command signal $y_c$ and a reference model output signal $y_m$;
   a plant model comprising an approximation of the plant and operatively coupled to receive the reference control signal $u_{ec}(y_m)$ from the reference controller and produce the reference model output signal $y_m$;
   a first combining unit operatively coupled to the plant and the plant model to find a difference between at least the plant output signal y and the reference model output signal $y_m$ to generate the plant output error signal $\tilde{y}$;
   an adaptive control unit operatively coupled to the first combining unit to receive the plant output error signal $\tilde{y}$ and generate an adaptive control signal $u_{ad}$ based on the plant output error signal $\tilde{y}$; and
   a second combining unit operatively coupled to the adaptive control unit, the nominal controller and the plant to augment the nominal control signal $u_{ec}$ based on the adaptive control signal $u_{ad}$.

2. An apparatus as claimed in claim 1,
   wherein a plant control signal u comprises the augmented nominal control signal $u_{ec}$;
   wherein the adaptive control unit comprises a neural network having connection weights updated based on the plant output error signal $\tilde{y}$, the neural network receiving the plant control signal u and the plant output signal y as inputs, and generating a neural network control signal $u_{NN}$ based directly or indirectly on the plant control signal u, the plant output signal y, and the connection weights; and
   wherein the adaptive control unit outputs the adaptive control signal $u_{ad}$ based on the neural network control signal $u_{NN}$.

3. An apparatus as claimed in claim 1, wherein the adaptive control unit comprises:
   an error observer to generate an observed error signal $\hat{E}$ that estimates errors in states of the plant, including those plate states that are unavailable; and
   a neural network having connection weights M,N updated based on the observed error signal $\hat{E}$, the neural network receiving a plant control signal u and the plant output signal y as inputs, and generating a neural network control signal $u_{NN}$ based on the plant control signal u, the plant output signal y, and the connection weights M,N; and
   wherein the adaptive control unit outputs the adaptive control signal $u_{ad}$ based on the neural network control signal $u_{NN}$.

4. An apparatus as claimed in claim 3, wherein the adaptive control unit comprises a time delay unit coupled to receive and delay the augmented nominal control signal $u_{ec}$ and the plant output signal y to generate a delayed plant $\bar{u}_d$ and a delayed signal $\bar{y}_d$, respectively, the time delay unit coupled to provide a delayed plant control signal $\bar{u}_d$ and the delayed plant output signal $\bar{y}_d$ as inputs to the neural network for generation of the neural network control signal $\bar{u}_{NN}$.

5. An apparatus as claimed in claim 1, wherein the adaptive control unit comprises a time delay unit coupled to receive and delay the augmented nominal control signal $u_{ec}$ and the plant output signal y to generate a delayed signal $\bar{u}_d$ and a delayed signal $\bar{y}_d$, respectively, the time delay unit coupled to provide a delayed plant control signal $\bar{u}_d$ and the delayed plant output signal $\bar{y}_d$ to a nonlinear approximation unit for generation of the adaptive control signal $u_{ad}$.

6. An apparatus as claimed in claim 3, wherein the nominal controller generates a nominal controller state signal $x_c$, and the reference controller generates a reference controller state signal $x_{cm}$, and the adaptive control unit comprises a combining unit coupled to receive and difference the nominal controller state signal $x_c$ and the reference controller state signal $x_{cm}$, to generate a controller state error signal $x_{cm}-x_c$ for use by the error observer in generating the observed error signal $\hat{E}$.

7. An apparatus as claimed in claim 6, wherein the adaptive control unit comprises an auxiliary controller coupled to receive the plant output signal y and the controller state error signal $x_{cm}-x_c$, and generating an auxiliary controller signal $u_{dc}$ based on the plant output signal y and the controller state error signal $x_{cm}-x_c$, the auxiliary controller further coupled to provide the auxiliary controller signal $u_{dc}$ to the error observer for use in generating the observed error signal $\hat{E}$.

Page 5

8. An apparatus as claimed in claim 7, wherein the auxiliary controller is a linear controller.

9. An apparatus as claimed in claim 1, wherein the plant comprises an aerospace vehicle.

10. An apparatus as claimed in claim 1, wherein the apparatus is used to control a non-minimum phase system.

11. An apparatus as claimed in claim 1, further comprising:
at least one actuator coupled to receive the augmented nominal control signal $u_{ec}$ and coupled to the plant, and controlling the plant based on the augmented nominal control signal $u_{ec}$.

12. An apparatus as claimed in claim 11, wherein the actuator comprises a plurality of aerospace vehicle actuators.

13. An apparatus as claimed in claim 1, further comprising:
at least one sensor coupled to the plant and generating the plant output signal y based on a sensed output of the plant.

14. An apparatus as claimed in claim 1, wherein the plant comprises an aerospace vehicle and the sensed output comprises at least one output of a sensor of the aerospace vehicle.

15. A method comprising the steps of:
receiving a command signal $y_c$;
receiving an plant output signal y;
generating a nominal control signal $u_{ec}$ based upon a plant model of the plant in response to a difference between at least the command signal $y_c$ and the plant output signal y;
generating a reference control signal $u_{ec}(y_m)$ based upon a same said plant model in response to a difference between at least the command signal $y_c$ and a reference model output signal $y_m$;
generating the reference model output signal $y_m$ using an approximation of the plant based on the reference control signal $u_{ec}(y_m)$;
generating a plant output error signal $\tilde{y}$ based on a difference between at least the plant output signal y and the reference model output signal $y_m$;
generating an adaptive control signal $u_{ad}$ based on the plant output error signal $\tilde{y}$;
generating a plant control signal u based on the nominal control signal $u_{ec}$ and the adaptive control signal $u_{ad}$; and
controlling the plant based on the plant control signal u.

16. A method as claimed in claim 15,
wherein a controller state signal $x_c$ is generated based upon the plant model of the plant in response to a difference between at least the command signal $y_c$ and the plant output signal y;
wherein a a reference controller state signal $x_{cm}$ is generated based upon the same said plant model in response to a difference between at least the command signal $y_c$ and a reference model output signal $y_m$; and
wherein the adaptive control signal $u_{ad}$ is generated based on the output error signal $\tilde{y}$, the plant control signal u, the nominal controller state signal $x_c$, and the reference controller state signal $x_{cm}$.

17. A method as claimed in claim 16, wherein the nominal control signal $u_{ec}$ and the controller state signal $x_c$ are generated by a nominal controller.

18. A method as claimed in claim 15, wherein the method is used to control a non-minimum phase system.

19. A method as claimed in claim 16, further comprising the steps of:
generating a controller state error signal $x_{cm}-x_c$ based on the controller state signal $x_c$ and the reference controller state signal $x_{cm}$;
generating an observed error signal $\hat{E}$ based the output error signal $\tilde{y}$ and the controller state error signal $x_{cm}-x_c$;
delaying the plant control signal u to generate a delayed plant control signal $u_d$;
delaying the plant output signal y to generate a delayed plant output signal $y_d$; and
generating an adaptive control signal $u_{ad}$ based on the observed error signal $\hat{E}$, the current plant control signal u, the delayed plant control signal $u_d$, the current plan output signal y, and the delayed plant output signal $y_d$.

20. A method as claimed in claim 19, further comprising the steps of:
generating an auxiliary controller signal $u_{dc}$ based on the output error signal $\tilde{y}$ and the controller state error signal $x_{cm}-x_c$;
providing the auxiliary controller signal $u_{dc}$ to an error observer for use in generating the observed error signal $\hat{E}$;
generating a neural network control signal $u_{NN}$ based on the plant control signal u, the plant output signal y, and connection weights M,N; and
generating the adaptive control signal $u_{ad}$ based on the neural network control signal $u_{NN}$ and the auxiliary controller signal $u_{dc}$.

* * * * *